United States Patent [19]

Kurauchi et al.

[11] Patent Number: 4,929,650

[45] Date of Patent: May 29, 1990

[54] COATING MATERIAL FOR TENDON FOR PRESTRESSED CONCRETE

[75] Inventors: Makoto Kurauchi, Houston, Tex.; Michio Hashimoto, Chiba, Japan; Kiyoshi Hayasaki, Hyogo, Japan; Toshikazu Minami, Hyogo, Japan; Mutsuhiko Ohnishi, Hyogo, Japan; Yohei Suzuki, Chiba, Japan

[73] Assignees: Mitsui Sekiyu Kagaku Kogyo Kabushiki Kaisha, Tokyo; Shinko Kosen Kogyo Kabushiki Kaisha, Amagasaki, both of Japan

[21] Appl. No.: 223,588

[22] Filed: Jul. 25, 1988

[30] Foreign Application Priority Data

Jul. 27, 1987 [JP] Japan ................... 62-188608

[51] Int. Cl.$^5$ ............... G08G 59/68; G08G 59/40; G08G 59/56
[52] U.S. Cl. ..................... 523/455; 523/457; 523/466; 528/91; 528/93; 528/94; 528/109; 528/119; 528/120; 528/361; 528/365; 528/103
[58] Field of Search ............ 528/91, 93, 103, 109, 528/119, 123, 94, 120, 361, 365; 523/455, 457, 466

[56] References Cited

U.S. PATENT DOCUMENTS

| | | | |
|---|---|---|---|
| 3,732,286 | 5/1973 | Son et al. | 528/123 X |
| 3,759,914 | 9/1973 | Simms et al. | 528/123 X |
| 4,530,991 | 7/1985 | Hirai et al. | 528/123 |
| 4,670,533 | 6/1987 | Lauterbach | 528/123 X |
| 4,689,388 | 8/1987 | Hirai et al. | 528/117 X |
| 4,701,378 | 10/1987 | Bagga et al. | 528/120 X |

FOREIGN PATENT DOCUMENTS

| | | |
|---|---|---|
| 0129976 | 11/1985 | European Pat. Off. . |
| 0198398 | 10/1986 | European Pat. Off. . |
| 0219894 | 4/1987 | European Pat. Off. . |
| 0273564 | 7/1988 | European Pat. Off. . |

*Primary Examiner*—Earl Nielsen
*Attorney, Agent, or Firm*—Jordan and Hamburg

[57] ABSTRACT

A coating material for a tendon for prestressed concrete includes a curing composition, the curing time of which is so controlled that the composition is held in an uncured fluid state for a predetermined time after the concrete hardens. After the predetermined time passes, the composition cures. By coating a tendon for prestressed concrete with the coating material having such properties, an antirust effect of the tendon, an improved adhering force of the tendon to the concrete and a decreased cost of manufacturing prestressed concrete can be obtained.

10 Claims, 4 Drawing Sheets

COATING MATERIAL FOR TENDON FOR PRESTRESSED CONCRETE

BACKGROUND OF THE INVENTION AND RELATED ART STATEMENT

The present invention relates to a coating material for tendons for prestressed concrete, which is to be coated on the surface of tendons used in post-tensioning prestressed concrete systems in order to protect the tendons from rust and corrosion and integrate the tendons with the concrete.

A post-tensioning system, which is a typical method for manufacturing prestressed concrete, is usually carried out as follows.

A metal sheath is positioned before placing concrete. A tendon, such as prestressing steel (prestressing steel wire, prestressing steel strand, prestressing steel bar, or the like) is inserted in the sheath. After the concrete hardens, tension is applied to the tendon. Then, cement milk or the like is injected between the sheath and the tendon for the purpose of protecting the tendon from rust and corrosion and integrating the tendon with the concrete.

According to this method, however, such operations as inserting a tendon in a sheath and injecting cement milk are troublesome and take much time and labor, which consequently raises the cost of manufacturing prestressed concrete.

Further, the space between the tendon and the sheath is very narrow and generally a tendon is positioned in a curved manner in the concrete, so that cement milk cannot be sufficiently injected along the whole length of the tendon. Accordingly, there is a likelihood that the tendon will corrode at portions where the cement milk is insufficiently injected.

In order to solve the abovementioned problems, various methods to preliminarily coat a coating material on the surface of a tendon have been proposed. These methods can be substantially divided into the following two groups:

① one for obtaining antirust and anticorrosion effects,
② the other for preventing the tendon from attaching to the concrete.

An example of method ① is one which electrostatically coats the surface of a tendon of prestressing steel with an epoxy-resin as coating material. This method can obtain antirust and anticorrosion effects. However, because the coating material comes into a completely cured state after coating, this method needs such operations as inserting the tendon in a sheath and grouting to integrate the tendon with the concrete, which are required in the conventional post-tensioning system. Accordingly, it is impossible to lower the cost of manufacturing prestressed concrete. There has been proposed another method falling into the abovementioned groups ①, ②, which employs so-called unbonded prestressing steel which is coated with grease and then covered with polyethylene or the like. This method in which the abovementioned unbonded prestressing steel is positioned before placing concrete and tension is applied to the unbonded prestressing steel after the concrete hardens, has an advantage that the tension applied to the prestressing steel can be transmitted to the whole length of the prestressing steel because of the presence of the fluid grease between the prestressing steel and the concrete. As a result, a metal sheath used in the conventional post-tensioning system is not required, which naturally eliminates insertion of a tendon in a sheath, injection of cement milk and grouting, which are necessary operations for the conventional post-tensioning system. Accordingly, the disadvantage which causes the conventional post-tensioning system to be expensive can be eliminated. However, since grease as coating material does not harden, the tendon cannot adhere to the concrete forever, which consequently reduces the bending strength and the fatigue strength of the concrete.

In order to eliminate the abovementioned disadvantage of the method using unbonded prestressing steel, a method has been proposed which comprises coating a prestressing steel with thermosetting composition in an uncured state, positioning the steel similarly to the case of the abovementioned unbonded prestressing steel, and curing the coated thermosetting composition by heating the prestressing steel after applying tension to the prestressing steel by means of high-frequency heating or the like so as to make the prestressing steel adhere to the concrete. However, this method, which requires heating of the tensioned prestressing steel, is very dangerous. Further, it is impossible to accurately heat only a predetermined steel in a large-sized concrete construction. Accordingly, this method has disadvantages in that the prestressing steel cannot be made to adhere to the concrete over the whole length thereof.

In order to solve the abovementioned problems, an object of the present invention is to provide coating material for tendon for prestressed concrete which can provide prestressed concrete at a reduced cost and assure antirust and anticorrosion effects for the tendon and adherence of the tendon to the concrete.

SUMMARY OF THE INVENTION

According to the present invention, coating material for tendon for prestressed concrete comprises a curing composition the curing time of which is controlled so as to cure in a predetermined atmosphere in a predetermined time after the concrete hardens. By coating a tendon for prestressed concrete with coating material for tendon for prestressed concrete according to the present invention and arranging the tendon in the concrete, the coating material on the surface of the tendon is kept in an uncured and fluid state for a predetermined time after the concrete hardens. After the predetermined time, the coating material surely comes into a cured state. Consequently, by applying tension to the tendon when the coating material on the surface of the tendon is still in the uncured state, the tension can be transmitted to the tendon over the whole length thereof and the tendon can be made to surely adhere to the concrete after the coating material is cured. Further, since the tendon is coated with the coating material, antirust and anticorrosion of the tendon can be surely obtained.

As abovementioned, with the use of the coating material for tendon for prestressed concrete according to the present invention, prestressed concrete of good quality can be obtained merely by coating a tendon with the coating material and arranging the tendon in the concrete. Consequently, the operations of inserting a tendon in a sheath and grouting, which are required in the conventional post-tensioning system, can be omitted. Accordingly, it is possible to lower the cost of manufacturing prestressed concrete.

DESCRIPTION OF THE PREFERRED EMBODIMENTS

Figure 1:
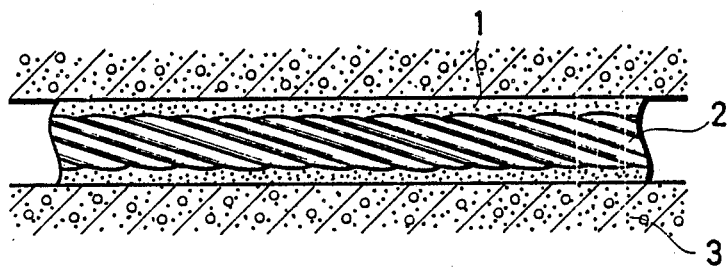
FIG. 1 is a sectional view showing a finished state of an embodiment of coating material for tendon for prestressed concrete according to the present invention.

A curing composition according to the present invention basically consists of a resin which is not cured as a simple substance at ordinary temperature and a latent curing agent which chemically cures the resin. However, a curing accelerator may be added to the composition, if necessary. Further, a filler, additives and the like may also be added.

The curing time of the curing composition can be controlled by changing the kinds and amounts of the latent curing agent and the curing accelerator.

As an example, a coating material includes an epoxy-resin curing composition which has, as a principal constituent, an epoxy-resin which does not cure as a simple substance at ordinary temperature and which consists of an epoxy-resin, a diluent, a latent curing agent, a curing accelerator, a filler and additives.

As the epoxy-resin, useful are liquid polyepoxides having more than two epoxy radicals per molecule and being polyalycidyl compounds of polyhydric phenols such as 2,2-bis (4-hydroxyphenyl) propane (popularly named bisphenol A), bis (4-hydroxyphenyl) methane (popularly called bisphenol F), 1, 1-bis (4-hydroxyphenyl) ethane (popularly called bisphenol AD), 2,2-bis (3, 5 dibromo-4-hydroxyphenyl) propane (popularly called TBA), hydroquinone and resorcine. Further, polyglycidyl compounds of polyhydric alcohols such as ethylene glycohol and glycerine and polyhydric carboxylic acid such as phthalic acid can also be used as the epoxy-resin.

As the diluent, a widely used reactive diluent such as n-butylglycidyl ether, an ester of phthalic acid such as dioctyl phthalate, benzyl alcohol, fluorophenyl alcohol and the like can be used.

As the latent curing agent, the following substances which are stable for a long time at normal temperature can be used; for example, dihydrazides such as dihydrazide adipic and dihydrazide sebacic acid, diphenyldiaminosulphone, dicyandiamide, 2-methylimidazole and their derivatives. $BF_3$.amine complex and the like.

As the curing accelerator, tertiary amines such as 2, 4, 6, -tris (N, N-dimethylaminomethyl) phenol, N, N-benzylmethylamine and the like can be used.

The filler is added for the purpose of controlling viscosity, thixotropic property and the like, and calcium carbonate, talc, silica and the like can be used as the filler.

The additive is added for the purpose of dispersing filler and preventing precipitation of filler, and commercial aerosil and the like can be used as the additive.

The mixing ratio of the constituents of the coating material will now be described. The mixing ratio of the epoxy-resin and the latent curing agent varies depending on the selection of the epoxy-resin and the latent curing agent. When a latent curing agent having an active hydrogen such as dihydrazide is used, the molar ratio of the latent curing agent to the epoxy radical of the epoxy-resin is preferably 1:0.5 to 2.0. On the other hand, when an ionic curing agent such as $BF_3$.amine complex, tertiary amine or the like is used, the ratio of the latent curing agent to the epoxy-resin is preferably 0.5 to 1.0 phr (1 part per hundred parts of resin). The amount of the curing accelerator is preferably 0.05 to 0.5 phr and the amounts of the diluent and filler are preferably determined in consideration of the viscosity of the composition.

When a coating material according to the present invention is used in the post tensioning system, after coating the coating material on the surface of a tendon, the tendon is arranged in a predetermined position and then concrete is placed. After the concrete attains a predetermined strength, tension is applied to the tendon.

Figure 2:
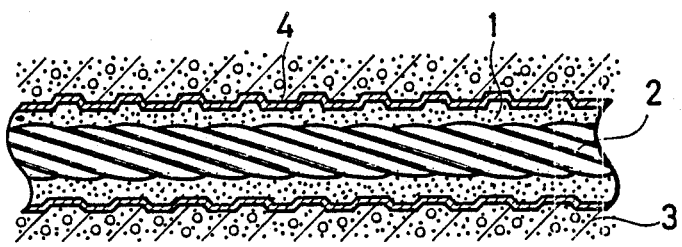
FIG. 2 is a sectional view showing another finished state of the embodiment of FIG. 1.

FIG. 1 shows a tendon coated with a coating material of the present invention which is placed in prestressed concrete. In FIG. 1, indicated at 1 is coating material, 2 is a prestressing steel wire or tendon, and 3 is prestressed concrete. As shown in FIG. 2, the coating material 1 may be covered with a sheath 4 having a spiral recess. The sheath may be made of metal such as conventional steel, or resin such as polyethylene or the like.

It takes 3 days to 2 weeks for concrete to attain a predetermined strength after placement. The coating material must not cure before the concrete attains the predetermined strength. For these reasons, the coating material is preferably controlled so as to cure in at least more than 3 days after making the coating material (i.e. mixing curing compositions). Further, it is preferable that the coating material cures so rapidly after applying tension as to assure integration of the concrete with the tendon. Accordingly, the coating material is preferably controlled so as to cure within one year.

The thickness of coated layer of the coating material is preferably 20 $\mu$m or more. This is because if the thickness is less than 20 $\mu$m, pinholes are apt to occur in the layer, so that the anticorrosion effect lowers, and the tendon and the concrete are not sufficiently separated from each other when tension is applied to the tendon, so that the coefficient of friction increases.

The coating material may be coated by brushing, dipping or the like. The manner of coating is not limited.

The present invention will be described in more detail by the following examples.

EXAMPLE 1

Figure 3:
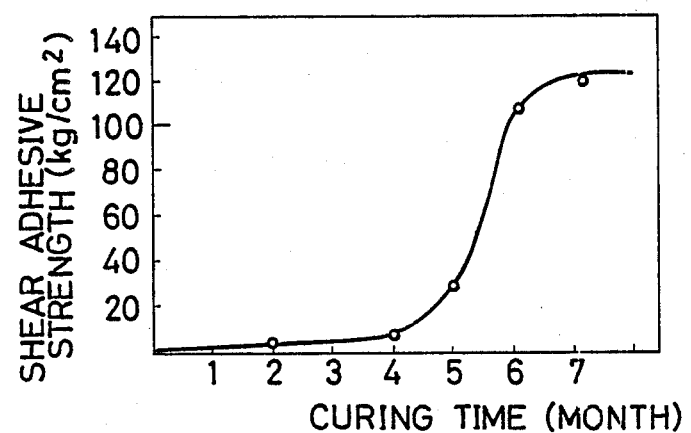
FIG. 3 is a graph showing the relationship between the curing time and the shear adhesive strength of the embodiment of FIG. 1.
Figure 4:
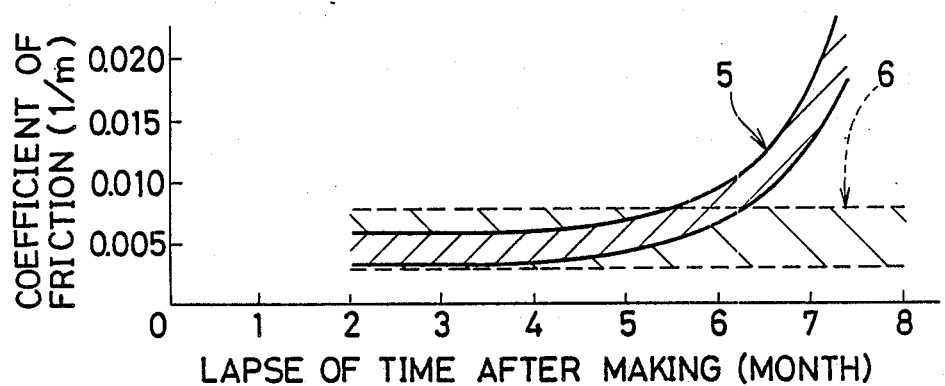
FIG. 4 is a graph showing the relationship between the lapse of time after placing concrete and the coefficient of friction.

To 90 parts of epoxy-resin of bisphenol A type (epoxy equivalents, 189; viscosity, 130 poise), 10 parts of benzyl alcohol as a diluent, 7 parts of dicyandiamide as a latent curing agent, 0.12 part of 2, 4, 6-tris (N, N-dimethylaminomethyl) phenol as a curing accelerator, 50 parts of talc as a filler and 1 part of aerosil as an additive were added and mixed under stirring. A coating material including a curing composition was then obtained. This coating material is called Sample 1. The relationship between the curing time and the shear adhesive strength (iron/iron) of the coating material of Sample 1 in an atmosphere having a temperature of 20° C. was examined. The result is shown in FIG. 3. As shown in FIG. 3, the shear adhesive strength of the coating material of Sample 1 after 7 months was kept at 135 kg/cm$^2$. One month after making, the coating material was applied over a prestressing steel strand having a diameter of 12.7 mm at a layer thickness of 0.5 to 1.0 mm, and arranged in concrete as shown in FIG. 1. After two months, measurements of the coefficient of friction between the concrete and the prestressing steel strand were begun. For comparison, a conventional unbonded prestressing steel strand coated with grease and then covered with polyethylene sheath was arranged in concrete, and the measurements of the coefficient of friction between the concrete and the prestressing steel strand were begun after two months. The results are shown in FIG. 4. In FIG. 4, a zone 5 shows the result of the coating material of Sample 1, and a zone 6 shows the result of the conventional unbonded prestressing steel strand. The coefficient of friction referred to here means how much of the tension applied to one end of a prestressing steel strand arranged in the concrete is lost in a length in which the tension is transmitted to the other end of the prestressing steel strand and is indicated as a loss per applied tension per unit length (m). The value obtained by multiplying the value of the applied tension by the value of the coefficient of friction indicates the tension lost per unit length.

With Sample 1, six months after making, the coefficient of friction of the coating material is as low as that of the conventional unbonded prestressing steel strand. Therefore, it is seen that in the period of six months, applied tension was sufficiently transmitted over the whole length of the prestressing steel strand. After six months, the coefficient of friction of the coating material of the present invention rose steeply. It is seen from this result that the coating material including the curing composition cured and consequently the prestressing steel strongly adhered to the concrete by means of the coating material of the present invention. On the contrary, in the case of the conventional unbonded prestressing steel strand, it is seen that the coefficient of friction did not rise even after 6 months and the prestressing steel strand did not adhere to the concrete.

Figure 5:
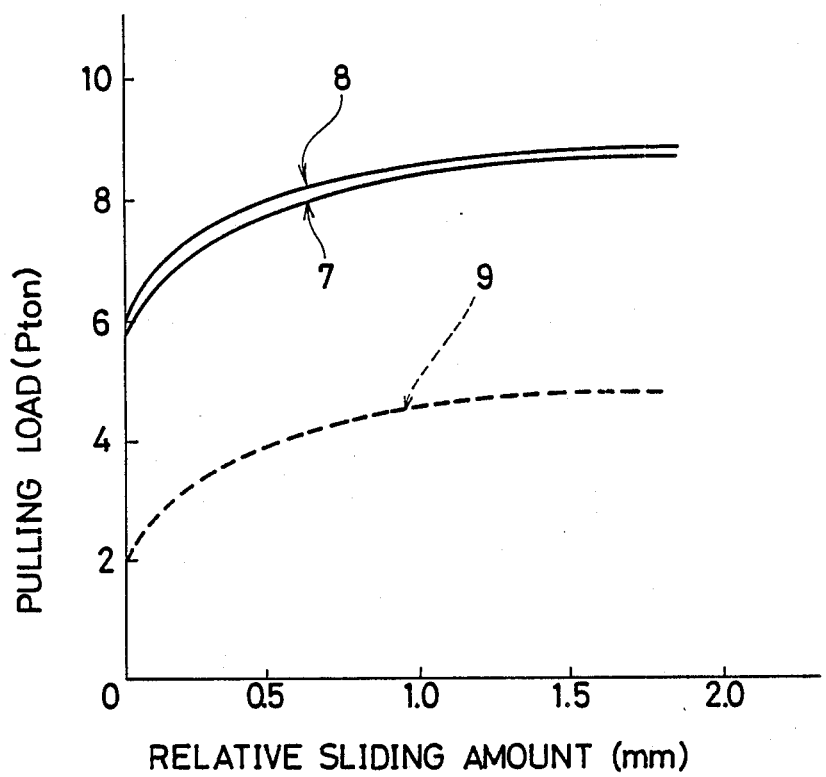
FIG. 5 is a graph showing the relationship between the relative sliding amount of a tendon to the concrete and the pulling load.

Further, the coating material of Sample 1 was applied to prestressing steel strands of a diameter of 12.7 mm at a layer thickness of 0.5 to 1.0 mm and the coated strands were arranged in concrete in two variations as shown in FIG. 1 and FIG. 2. After 7 months, the pulling loads of the two strands were measured. For comparison, a prestressing steel strand uncoated with the coating material was arranged in concrete and the pulling load thereof was measured after 7 months. The result is shown in FIG. 5. In FIG. 5, the ordinate indicates the pulling load and the abscissa indicates the sliding amount of the prestressing steel strand relative to the concrete. A curve 7 shows the case of coating a prestressing steel strand with the coating material of Sample 1 and arranging it in the concrete as shown in FIG. 1. A curve 8 shows the case of similarly coating a prestressing steel strand with the coating material of Sample 1 and arranging it as shown in FIG. 2. A curve 9 shows the case of arranging a prestressing steel strand not coated with coating material in the concrete.

In the case of coating the prestressing steel strand with the coating material and arranging the coated strand in the concrete as shown in FIG. 1, the maximum pulling load was 8.7 tons. In the case of coating the prestressing steel strand with the coating material and arranging the coated strand in the concrete as shown in FIG. 2, the maximum pulling load was 8.9 tons. On the other hand, in the case of arranging the uncoated strand in the concrete, the maximum pulling load was 4.9 tons. Further, an unbonded prestressing steel strand was arranged in concrete and the pulling load was measured after 7 months. The value was extremely small. It is seen from the abovementioned results that by using the coating material of Sample 1, a sufficient adhering force is obtained between the concrete and the prestressing steel strand after a predetermined time.

Figure 6:
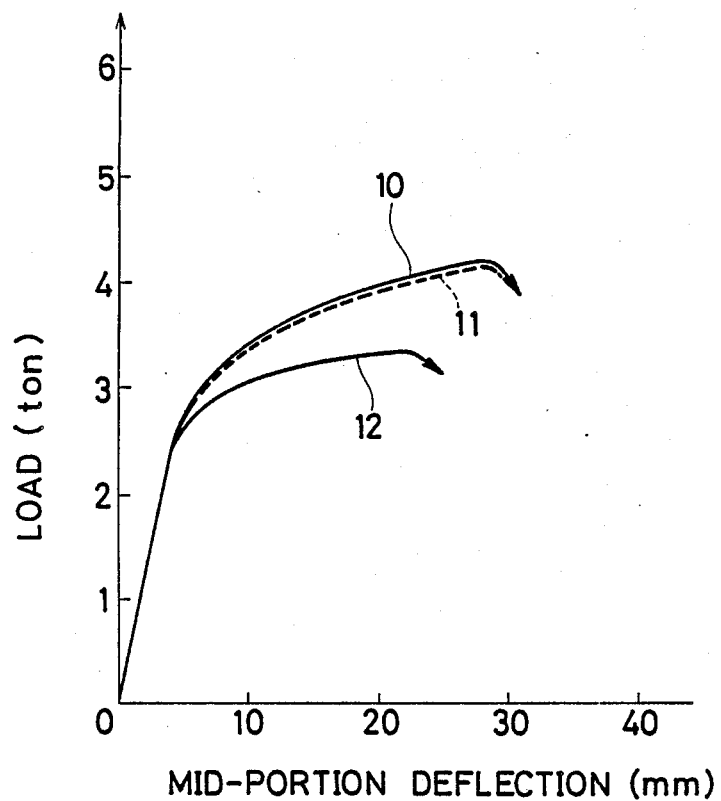
FIG. 6 is a graph showing the relationship between the deflection amount at opposite end supports of a concrete beam and the bending load.

Further, the coating material of Sample 1 was applied to a prestressing steel strand of a diameter of 12.7 mm at a layer thickness of 0.5 to 1.0 mm, and the coated strand was arranged in concrete as shown in FIG. 1. After 7 months, a bending test of this concrete beam was carried out in a manner corresponding to the bending test defined in JIS A 1106. The result is shown by a curve 10 in FIG. 6. In FIG. 6, the ordinate indicates the bending load and the abscissa indicates the mid-portion deflection. For comparison, a beam was manufactured by arranging a prestressing steel strand and grouting it with cement milk in a manner employed in conventional post-tensioning systems. The result of a bending test of this beam is shown by curve 11 in FIG. 6. Further, another beam was manufactured by using an unbonded prestressing steel strand, and a bending test of this beam was carried out. The result is shown by curve 12 in FIG. 6. It is seen from these results that the beam manufactured by using the coating material of Sample 1 has substantially the same bending strength (4.2 tons) and deflection amount as the beam obtained by grouting with cement milk used in the conventional post-tensioning system and the beam using the coating material of Sample 1 is better than the beam using conventional unbonded prestressing steel strand.

Figure 7:
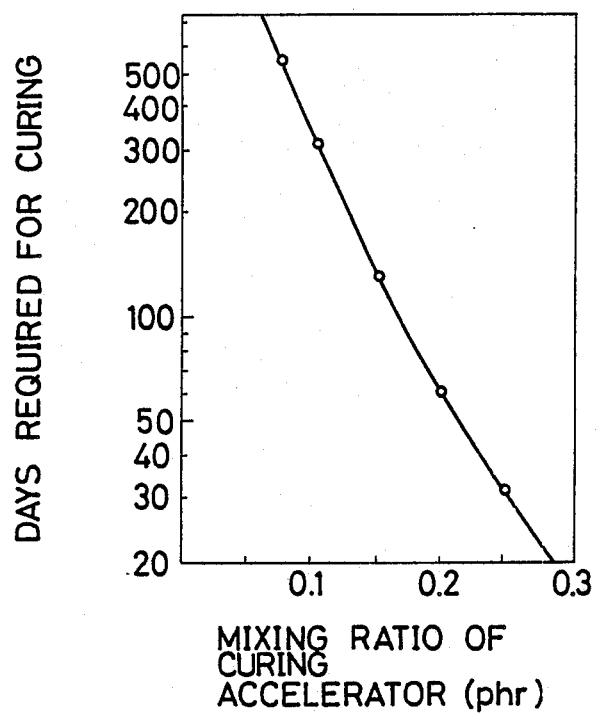
FIG. 7 is a graph showing the relationship between the composition ratio of a curing accelerator in the embodiment of FIG. 1 and the number of days required for curing.

In the coating material of Sample 1, furthermore, the mixing ratio of the curing accelerator was changed to 0.07, 0.10, 0.15, 0.20 and 0.25 phr, to examine the relationship between the mixing ratio of the curing accelerator and the number of days required for curing of the coating material. The result is shown in FIG. 7. Further, the shear adhesive strength of the coating material (iron/iron) at each of the abovementioned mixing ratios of the curing accelerator was measured and the result is shown in Table 1.

TABLE 1

| Mixing ratio of curing accelerator (phr) | Shear adhesive strength (iron/iron) (kg/cm$^2$) |
| --- | --- |
| 0.07 | 140 |
| 0.10 | 135 |
| 0.15 | 110 |
| 0.20 | 130 |
| 0.25 | 115 |

It is seen from FIG. 7 that by changing the mixing ratio of curing accelerator, the curing time of the coating material can be so controlled that the coating material can cure in a predetermined time in a predetermined atmosphere. Further, as shown in Table 1, the shear adhesive strength in every case is higher than 110 kg/cm$^2$, and the coating material in which the mixing ratio of the curing accelerator is variously changed as abovementioned has also substantially the same pulling load and bending load as the coating material of Sample 1.

EXAMPLE 2

To 90 parts of an epoxy-resin of bisphenol A type (epoxy equivalents, 189; viscosity, 130 poise), 10 parts of n-butylglycidyl ether as a diluent, 3 parts of dihydrazide adipate powdered to a 150 mesh pass as a latent curing agent, 0.03 part of 2, 4, 6-tris (N-N-dimethylaminomethyl) phenol as a curing accelerator, 50 parts of calcium carbonate as a filler and 3 parts of disparlon 6900-20X (produced by Kusumoto Kasei Co. Ltd.) as an additive were added and mixed under stirring. A coating material including a curing composition was consequently obtained. This coating material had a shear adhesive strength of 105 kg/cm$^2$ six months after making. The relationship between the curing time and the shear adhesive force of this material, and the relationship between the mixing ratio of 2, 4, 6-tris (N, N-dimethylaminomethyl) phenol as the curing accelerator and the number of days required for curing this coating material and the shear adhesive strength were examined and the results are shown in Tables 2 and 3.

TABLE 2

| Curing time (months) | Shear adhesive strength (kg/cm$^2$) |
| --- | --- |
| 3 | uncured state |
| 4 | uncured state |
| 5 | 18 |
| 6 | 105 |

TABLE 3

| Mixing ratio of curing accelerator (phr) | Days required for curing (days) | Shear adhesive strength (kg/cm$^2$) |
| --- | --- | --- |
| 0.25 | 13 | 90 |
| 0.10 | 40 | 98 |
| 0.05 | 90 | 110 |
| 0.03 | 180 | 108 |

EXAMPLE 3

To 100 parts of an epoxy-resin of bisphenol AD type (epoxy equivalent, 175; viscosity, 32 poise), 4 parts of diphenylaminosulphone powdered to a 150 mesh pass as a latent curing agent, 0.05 parts of 2, 4, 6-tris (N, N-dimethylaminomethyl) phenol as a curing accelerator, 35 parts of talc as a filler, and 1 part of aerosil as an additive were added and mixed under stirring. A coating material including a curing composition was consequently obtained. This coating material attained a shear adhesive strength of 165 kg/cm$^2$ six months after making.

EXAMPLE 4

To 90 parts of an epoxy-resin of bisphenol A type (epoxy equivalent, 188; viscosity, 130 poise), 10 parts of benzyl alcohol as a diluent, 50 parts of talc as a filler, 3 parts of BF$_3$.amine curing agent (Anchor 1040 manufactured by Anchor Chemical Co. Ltd.) as a latent curing agent, and 3 parts of disparlon 6900-20X (produced by Kusumoto Kasei Co. Ltd.) as an additive were added and mixed under stirring. A coating material including a curing composition was consequently obtained. This coating material attained a shear adhesive strength of 140 kg/cm$^2$ in an atmosphere of 21° C. five months after making.

It is apparent from these results that the coating materials of Examples 2 to 4 attain the same quality as that of the coating material of Sample 1.

What is claimed is:

1. A coating material for a tendon for prestressed concrete comprising 100 parts of epoxy resin, a latent curing agent, and 0.03 to 0.5 parts by weight of a curing accelerator, the latent curing agent being selected from the group consisting of dihydrazide, diphenyldiaminosulphone, dicyandiamide, 2-methylimidazole and derivatives thereof, and BF$_3$.amine complex, the curing accelerator being 2,4,6-tris(N,N-dimethylaminomethyl) phenol, the coating material being curable in at least more than three days at ambient temperature.

2. A coating material according to claim 1 further comprising a diluent and a filler.

3. A coating material according to claim 1 wherein the coating material is curable in from more than three days up to one year at ambient room temperature.

4. A coating material according to claim 1, wherein said epoxy resin is selected from the group consisting of polyglycidyl compounds of polyhydric phenols, polyglycidyl compounds of polyhydric alcohols and polyhydric carboxylic acids.

5. A coating material according to claim 4, wherein said polyglycidyl compounds of polyhydric phenols are selected from the group consisting of bisphenol A, bisphenol AD, TBA, hydroquinone and resorcinol, said polyglycidyl compounds of polyhydric alcohols are selected from the group consisting of ethylene glycol and glycerine and said polyhydric carboxylic acid is phthalic acid.

6. A coating material according to claim 1, wherein said dihydrazide is selected from the group consisting of dihydrazide of adipic acid and dihydrazide of sebacic acid.

7. A coating material according to claim 2, wherein said filler is selected from the group consisting of calcium carbonate, talc and silica, said coating material further comprising aerosil as an additive for dispersing and preventing precipitation of said filler.

8. A coating material according to claim 1, wherein said latent curing agent has an active hydrogen and the molar ratio of said latent curing agent to the epoxy radical of said epoxy resin ranges from 1:0.5 to 2.0.

9. A coating material according to claim 1, wherein said latent curing agent is ionic and the ratio of said latent curing agent to said epoxy resin is 0.5 to 1.0 part curing agent per 100 parts epoxy resin.

10. A coating material according to claim 1, wherein said curing accelerator is 0.05 to 0.5 parts by weight.

* * * * *